(12) United States Patent
Rice

(10) Patent No.: US 6,195,721 B1
(45) Date of Patent: Feb. 27, 2001

(54) INTER-PROCESSOR DATA TRANSFER MANAGEMENT

(75) Inventor: Steven E. Rice, Aloha, OR (US)

(73) Assignee: Tektronix, Inc., Beaverton, OR (US)

( * ) Notice: Subject to any disclaimer, the term of this patent is extended or adjusted under 35 U.S.C. 154(b) by 1199 days.

(21) Appl. No.: 08/632,183

(22) Filed: Apr. 15, 1996

Related U.S. Application Data

(63) Continuation of application No. 08/190,969, filed on Feb. 3, 1994, now abandoned.

(51) Int. Cl.[7] ................................................. G06F 13/00
(52) U.S. Cl. ........................ 710/129; 709/201; 709/300
(58) Field of Search .................................. 395/280, 309; 710/107, 129, 33; 709/201, 300

(56) References Cited

U.S. PATENT DOCUMENTS

| | | | |
|---|---|---|---|
| 4,926,375 | * 5/1990 | Mercer et al. | 364/900 |
| 5,045,998 | * 9/1991 | Begun et al. | 364/200 |
| 5,309,567 | * 5/1994 | Mizukami | 395/325 |
| 5,327,570 | * 7/1994 | Foster et al. | 395/800 |
| 5,410,654 | * 4/1995 | Foster et al. | 395/275 |

* cited by examiner

Primary Examiner—Gopal C. Ray
(74) Attorney, Agent, or Firm—Francis I. Gray

(57) ABSTRACT

An inter-processor data transfer management system uses an interface circuit to decouple a requesting processor from a responding processor so that the requesting processor does not need to wait for the responding processor after transmitting a data transfer request. The data transfer request is stored in an interface circuit between the processors. The interface circuit arbitrates for the responding processor bus, and completes the data transfer when granted access by the responding processor. For read sequences the requesting processor receives a data word from the interface circuit as the data transfer request is stored in the interface circuit. The first data word received by the requesting processor during a read operation is ignored, and the last data transfer request during a read operation has a dummy address.

3 Claims, 1 Drawing Sheet

INTER-PROCESSOR DATA TRANSFER MANAGEMENT

This is a continuation of application Ser. No. 08/190,969, filed Feb. 3, 1994 and now abandoned.

BACKGROUND OF THE INVENTION

The present invention relates to data transfer management between data processors, and more particularly to inter-processor data transfer management for increasing overall throughput for both processors.

When transferring data from one data processor to another, each data processor having its own bus, delays in the transfer are unpredictable in that the bus for the responding data processor may not be immediately available to the requesting data processor. This problem is increased where the two processors run asynchronously, and is even worse where the processors run at different clock rates. The stalling of the requesting processor while waiting for the availability of the responding processor is further increased where large amounts of data are to be transferred.

SUMMARY OF THE INVENTION

Accordingly the present invention provides a system for inter-processor data transfer management that uses an interface circuit between the processors. The interface circuit receives a data transfer request from a requesting processor and acknowledges the request so that the requesting processor may continue to run without waiting for completion of the request. The interface circuit then arbitrates for the bus of the responding processor and completes the data transfer between the responding processor and the interface circuit. At the completion of the transfer the interface circuit advises the requesting processor that it is ready for another request, and upon receipt of another request the interface circuit completes the prior request with the requesting processor.

The objects, advantages and novel features of the present invention are apparent from the following detailed description when read in conjunction with the appended claims and attached drawing.

DESCRIPTION OF THE PREFERRED EMBODIMENT

Figure 1:
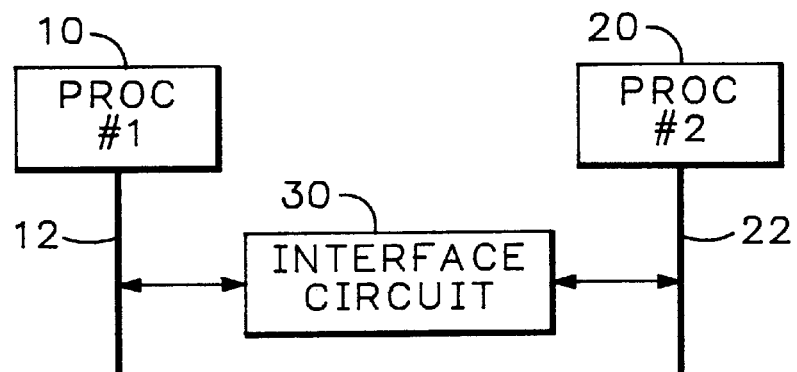
FIG. 1 is a block diagram view of a system for inter-processor data transfer management according to the present invention.

Referring now to FIG. 1 a first processor 10 has an associated bus 12 for performing a first set of program applications. A second processor 20 has an associated bus 22 for performing a second set of program applications. Coupled between the buses 12, 22 is an interface circuit 30. Address, data and control lines that make up the first bus 12 are coupled to one side of the interface circuit 30, and address, data and control lines that make up the second bus 22 are coupled to the other side of the interface circuit.

Figure 2:
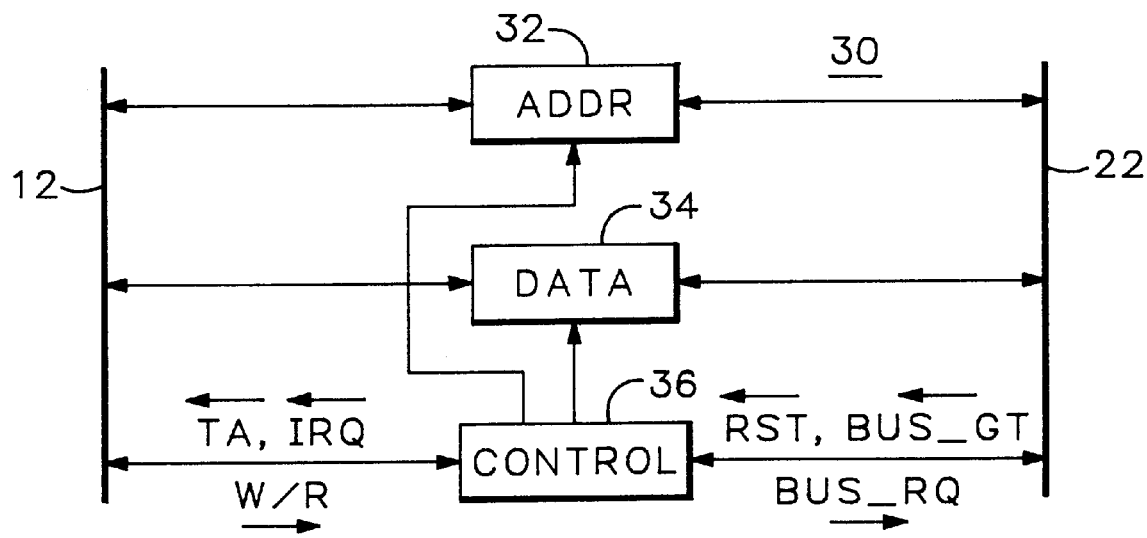
FIG. 2 is a block diagram view of an interface circuit for the system of FIG. 1 according to the present invention.

As shown in FIG. 2 the interface circuit 30 has an address buffer 32 coupled between the address lines of the buses 12, 22 for storing and transferring an address from one processor 10 to the other 20, a data buffer 34, which may be a FIFO buffer for multi-word burst transfers, coupled between the data lines of the buses, and a control logic circuit 36 coupled between the control lines of the buses 12, 22 for communicating with the processors 10, 20 and for controlling the address and data buffers 32, 34. The address buffer 32 also may be a FIFO in a system where burst accesses are not supported, as considerable advantage is often gained by performing multiple data transfers per bus arbitration. A FIFO as the address buffer 32 has the additional advantage of permitting scatter/gather transfers, i.e., sequential data transferred to/from non-sequential addresses. Alternatively the address buffer 32 may contain both an address register and an address generator, allowing multiple data transfers without the hardware overhead of a FIFO.

The requesting processor 10 places a request on its bus 12 that includes a destination address and data (if the request is a write request) for the responding processor bus 22. The control logic circuit 36 provides an acknowledge response to the requesting processor 10 and stores the address and data in the respective address and data buffers 32, 34, or provides the acknowledge response together with the data from the data buffer if the request is a read request. The requesting processor 10, upon receipt of the acknowledge response, continues to run its applications rather than wait for completion of the request.

Once the request from the requesting processor 10 is acknowledged by the interface circuit 30, the control logic circuit 36 then arbitrates for control of the responding processor bus 22 by sending a bus request to the responding processor 20. Once the responding processor 20 is ready to accept the request from the interface circuit 30, a bus grant signal is returned to the control logic circuit 36. The address is transferred from the address buffer 32 to the responding processor bus 22. The data also is transferred from the data buffer 34 if the request is a write request. For a read operation the responding processor bus 22 transfers the data at the address from the address buffer 32 to the data buffer 34. At completion of the transfer the control logic circuit 36 releases the responding processor bus 22 and alerts the requesting processor 10 that the interface circuit 30 is ready for another request.

The interface circuit 30 serves to decouple the transfers of data between the processors 10, 20 by providing storage and control capabilities. Full benefit is gained when the requesting processor 10 pipelines the transfers and allows the interface circuit 30 to control the timing of the transfer. In more detail the requesting processor 10 accesses the interface circuit 30 with a transfer request, indicating a desire to either read data from or write data to the memory of the other processor 20. The interface circuit 30 latches the address in the address buffer 32 and the data, if a write request, in the data buffer 34, and terminates the cycle with an acknowledgement to the requesting processor 10. The control logic circuit 36 asserts an access request to the arbitration logic of the other processor 20. When the access is granted, the interface circuit 30 performs the requested operation and relinquishes the responding processor's bus 22. The control logic circuit 36 then asserts an interrupt or direct memory access (DMA) request to the requesting processor 10. The requesting processor 10 receives the data (on a read) or supplies the next data word to transfer (on a write), along with the address of the next location to be accessed. Transfers continue with minimal throughput degradation for both processors. If the operation was a read request, the requesting processor 10 transmits a dummy request to the control logic circuit 36 to transfer the last data for the request from the data buffer 34 to the requesting processor.

For one particular implementation a Motorola 96002 digital signal processor (DSP) has two built-in DMA controllers and runs at 33 MHz. The DMA controllers are capable of operating concurrently with other processing. When initiating a DMA transfer from main memory of another computer 20, such as a Motorola 68040 computer processing unit (CPU) running at 25 MHz, to any memory space of the DSP where the DSP is the requesting computer 10, a number of steps are taken:

1. The source address in CPU memory is set to the address of the first location to be transferred.
2. The destination address in DSP memory is set to one less than the address of the first location to be filled with valid data.
3. The transfer count is set to one more than the number of data words to be transferred.
4. The DMA controller mode is set such that it initiates a transfer of one word of a block of data to be moved upon signal from the interface circuit 30.
5. The interface circuit is signalled to assert the first request, beginning the transfer sequence. The first transfer causes the interface circuit to latch the CPU memory source address and return a data word to the DMA which is ignored, which is the reason the destination address is set to one less than the address of the first location to be filled with valid data.
6. The interface circuit then issues an access request to CPU memory. When access is granted, the latched address is used to retrieve one word (or four words in burst mode) from the CPU memory. The data is latched in the data buffer, and the interface circuit signals the DMA controller in the DSP to assert the next request.
7. For the rest of the DMA transfer the data word corresponding to the previous memory address is retrieved from the data buffer, the next address is latched by the address buffer, and the control logic circuit initiates an access to retrieve the data word. For a transfer of 100 data words from the CPU memory to the DSP memory, 101 requests are initiated by the DMA controller since the first data word is ignored and the last source address for the CPU is a dummy.

When going in the other direction it is not necessary to transfer an extra data word. For DMA transfers from the memory space of the DSP to CPU memory, the following steps are taken:

1. The source address in DSP memory is set to the address of the first location to be transferred.
2. The destination address in CPU memory is set to the address of the first location to be filled with valid data.
3. The transfer count is set to the number of data words to be transferred.
4. The DMA controller mode is set such that it initiates a transfer of one word (or four words if in burst mode) of the block to be moved upon signal.
5. The interface circuit is signalled to assert the first request, beginning the transfer sequence. The first transfer causes the interface circuit to latch the CPU memory destination address and the data word(s) from the DMA. The control logic circuit then issues an access request to the CPU. When access is granted, the latched address and data are used to store the data word(s) into CPU memory, and the control logic circuit signals the DMA controller to assert the next request.

The 96002 has an address space four times larger than that of the 68040, so the DSP address space may be segmented into four address spaces, one of which may be used as the DMA space. Four words of data may be buffered and moved to and from CPU main memory in four word bursts, as indicated above, while presenting a single word per transfer interface to the DSP. This reduces the CPU bus loading caused by DMA transfers to and from the DSP by reducing the number of arbitration requests by about seventy-five percent (75%), i.e., one arbitration request per four data words transferred instead of four arbitration requests. Also the data transfer time, i.e., the actual CPU bus access time required to transfer four data words, is reduced by approximately fifty percent (50%) in the burst transfer mode. In the burst transfer mode the transfers are on a four-word boundary. Also to ensure complete transfer of the data the blocks to transfer are a multiple of four words long.

If the requesting processor 10 has an address space smaller than that of the responding processor, all that is required is the addition of a latch to hold the required upper address bits for the transfer. The latch could be either external or internal to the interface circuit 30 when implemented as an application specific integrated circuit (ASIC).

Although the particular implementation described above uses a resident DMA controller in the requesting processor 10, transfers may also be controlled by an interrupt process, as is well known in the art. Further either processor 10, 20 may be the requesting or responding processor for full bi-directional operation. For simultaneous bi-directional operation the data and address buffers 32, 34 are multiple parallel buffers that provide two separate paths so both processors 10, 20 may access the interface circuit 30 via the separate paths. Additionally the interface circuit 30 could arbitrate for both buses at the same time so that transfers routinely occur in both directions at the same time. Since the data is stored internally in the data buffer 34, only one port needs to be active at a time for each transfer.

Thus the present invention provides an inter-processor data transfer management system that allows data transfer between processors without stalling the requesting processor by using an interface circuit which has storage and control capabilities for decoupling the transfers.

What is claimed is:

1. An interface circuit for inter-processor data transfer management comprising:

means coupled between a requesting processor bus and a responding processor bus for storing in response to a transfer request initiated by the requesting processor an address and data, the address being an access address to the responding processor and the data being data from the requesting processor for storage at the access address for a write request or data from the responding processor for transfer from the access address for a read request; and means coupled between the requesting processor bus and the responding processor bus for controlling the storing means and for communicating with requesting and responding processors so that the processors are decoupled from the data transfer in that the transfer request by the requesting processor for access to the responding processor is acknowledged by the controlling means so that the requesting processor may continue its processing until an interrupt is received from the controlling means indicating that the controlling means has completed the request and is ready to receive another request, and the controlling means arbitrates for access to the responding processor bus to complete the data transfer between the responding processor and the storing means so that the responding processor may continue its processing while the data transfer takes place;

whereby the interface circuit controls the data transfer between the requesting and responding processors so that the processors do not stall during such data transfer.

2. A method of interfacing between a requesting processor and a responding processor using an interface circuit coupled between the respective processor buses which controls data transfer between the processors such that the processors do not stall during such data transfer comprising the steps of:

setting an access address in the requesting processor to an address on the responding processor bus defining a first location from which a data word is to be transferred;

setting a destination address in the requesting processor to one less than a first address for receiving the data word;

setting a transfer count to one more than a number of data words to be transferred;

initiating a transfer request by the requesting processor to the interface circuit over the requesting processor bus to begin the data transfer;

storing the access address from the requesting processor in the interface circuit and transferring data stored in the interface circuit to the requesting processor in response to the transfer request so that the requesting processor is free to continue its processing while the transfer request is completed;

requesting access to the responding processor bus by the interface circuit;

completing transfer of data between the interface circuit and the address on the responding processor bus when access is granted by the responding processor under control of the interface circuit so that the responding processor is free to continue its processing while the transfer request is completed;

signaling the requesting processor over the requesting processor bus that the interface circuit is ready for another request; and decrementing the transfer count and repeating the initializing, storing requesting, completing and signaling steps until the transfer count is exhausted.

3. A method of interfacing between a requesting processor and a responding processor using an interface circuit coupled between the respective processor buses which controls data transfer between the processors such that the processors do not stall during such data transfer comprising the steps of:

setting a source address in the requesting processor to a first location from which a data word is to be transferred to the responding processor;

setting an access address to a first location on the responding processor bus into which the data word is to be transferred;

initiating a transfer request of the data word by the requesting processor over the requesting processor bus to the interface circuit;

storing the access address and data word in the interface circuit in response to the transfer request so that the requesting processor is free to continue its processing while the transfer request is being completed;

requesting access by the interface circuit to the responding processor bus;

transferring the data word from the interface circuit to the responding processor bus at the access address when the responding processor grants access under the control of the interface circuit so that the responding processor is free to continue its processing while the transfer request is being completed;

signaling the requesting processor over the requesting processor bus that the interface circuit is ready for another transfer request.

* * * * *